United States Patent
Shim et al.

(10) Patent No.: US 8,939,099 B2
(45) Date of Patent: Jan. 27, 2015

(54) METHODS AND SYSTEMS FOR STITCHING COMPOSITE MATERIALS

(75) Inventors: Dong-Jin Shim, Cohoes, NY (US); Ian Francis Prentice, Cincinnati, OH (US); Julian O'Flynn, Halifax (CA); Ross Spoonire, Albany, NY (US); Wendy Wen-Ling Lin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 244 days.

(21) Appl. No.: 13/490,284

(22) Filed: Jun. 6, 2012

(65) Prior Publication Data
US 2013/0327262 A1 Dec. 12, 2013

(51) Int. Cl.
*D05B 3/00* (2006.01)
*B32B 3/14* (2006.01)

(52) U.S. Cl.
USPC .......... 112/475.17; 112/475.08; 112/412; 112/421; 428/102

(58) Field of Classification Search
CPC ........ B29C 65/08; B29C 65/48; B29C 65/56; B29C 65/62; B29L 2009/00; B29B 15/08; B29K 2105/06; B23B 3/14; D04H 1/45; D04H 1/52; D04H 3/10; D05B 93/00; D05C 9/00; D05C 17/00; D02G 3/46
USPC .......... 112/403, 406, 412, 475.08, 0.14, 0.17, 112/421; 156/91–93; 264/136; 428/102–104, 223; 442/354, 374
See application file for complete search history.

(56) References Cited

U.S. PATENT DOCUMENTS

| | | | | |
|---|---|---|---|---|
| 4,331,495 A | * | 5/1982 | Lackman et al. | 156/93 |
| 4,379,798 A | * | 4/1983 | Palmer et al. | 428/113 |
| 4,410,577 A | * | 10/1983 | Palmer et al. | 428/85 |
| 4,541,349 A | | 9/1985 | Inoue | |
| 5,019,435 A | * | 5/1991 | Cahuzac et al. | 428/36.1 |
| 5,186,776 A | | 2/1993 | Boyce et al. | |
| 5,268,055 A | | 12/1993 | Bales et al. | |
| 5,429,853 A | * | 7/1995 | Darrieux | 428/102 |
| 5,642,679 A | * | 7/1997 | Monget et al. | 112/470.13 |
| 6,106,646 A | | 8/2000 | Fairbanks | |
| 6,431,837 B1 | * | 8/2002 | Velicki | 416/223 R |
| 6,884,507 B2 | | 4/2005 | Lin et al. | |
| 7,022,632 B2 | | 4/2006 | Hatta et al. | |
| 7,659,217 B2 | | 2/2010 | Narayanan et al. | |
| 2005/0037683 A1 | | 2/2005 | Konishi et al. | |
| 2005/0118919 A1 | | 6/2005 | Link et al. | |
| 2009/0229761 A1 | * | 9/2009 | Joern et al. | 156/433 |

FOREIGN PATENT DOCUMENTS

| JP | 3222724 A | 10/1991 |
|---|---|---|
| JP | 3286841 A | 12/1991 |
| JP | 5169542 A | 7/1993 |

\* cited by examiner

*Primary Examiner* — Ismael Izaguirre
(74) *Attorney, Agent, or Firm* — Scott J. Asmus

(57) ABSTRACT

A composite material includes a composite body having a composite surface, and a reinforcing element extending through the composite body in a first plurality of stitches and a second plurality of stitches. The first plurality of stitches are aligned relative to the composite surface substantially similarly to each other. The second plurality of stitches are aligned relative to the composite surface substantially dissimilarly to each other.

13 Claims, 2 Drawing Sheets

METHODS AND SYSTEMS FOR STITCHING COMPOSITE MATERIALS

BACKGROUND

The present disclosure relates generally to stitching systems and, more particularly, to methods and systems for ultrasonically stitching composite materials.

At least some known engines include a plurality of fan blades that are fabricated from a metal material. Although metal fan blades are generally strong and/or durable, at least some known metal fan blades are heavy, resulting in lower fuel efficiency. To facilitate increasing fuel efficiency, at least some known fan blades are fabricated at least partially from a composite material.

Composite materials typically include a plurality of layers that are laminated together. The layers may, however, come apart or delaminate in at least some conditions. For example, at least some known composite fan blades induce high shear strains during extreme loading, resulting in the delamination of layers. To facilitate increasing a strength and/or a durability of the composite material, at least some known layers are stitched, needled, and/or stapled together prior to lamination and/or curing. At least some methods of stitching, needling, and/or stapling, however, may damage, affect, and/or alter a mechanical property of the composite material.

BRIEF SUMMARY

In one aspect, a method is provided for stitching a composite material including a composite body having a composite surface. The method includes coupling a guide to the composite surface to form an augmented surface, and extending a reinforcing element through both the guide and the composite body. The augmented surface includes a guide surface and a portion of the composite surface. The reinforcing element is aligned substantially perpendicular to the augmented surface.

In another aspect, a composite material is provided. The composite material includes a composite body having a composite surface, and a reinforcing element extending through the composite body in a first plurality of stitches and a second plurality of stitches. The first plurality of stitches are aligned relative to the composite surface substantially similarly to each other. The second plurality of stitches are aligned relative to the composite surface substantially dissimilarly to each other.

In yet another aspect, a system is provided. The system includes a composite body having a composite surface, a guide coupled to the composite surface to form an augmented surface, and a reinforcing element extending through both the guide and the composite body. The augmented surface includes a guide surface and a portion of the composite surface. The reinforcing element is aligned substantially perpendicular to the augmented surface.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The subject matter described herein relates generally to stitching systems and, more particularly, to methods and systems for ultrasonically stitching composite materials. In one embodiment, a composite material includes a composite body having a composite surface. A guide is coupled to the composite surface to form an augmented surface including a guide surface and an exposed portion of the composite surface. A stitching machine extends at least one reinforcing element through the composite body to facilitate increasing a strength of the composite material. More particularly, a first plurality of stitches extend through the composite body substantially perpendicular to the composite surface, and a second plurality of stitches extend through the composite body and the guide substantially perpendicular to the guide surface.

The features, functions, and advantages described herein may be achieved independently in various embodiments of the present disclosure or may be combined in yet other embodiments, further details of which may be seen with reference to the following description and drawings. "Stitching", "sewing", "needling", and "tufting" are used herein to describe passing or extending a reinforcing element through a material. The reinforcing element may be passed through the material at regular or irregular intervals. Moreover, an element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
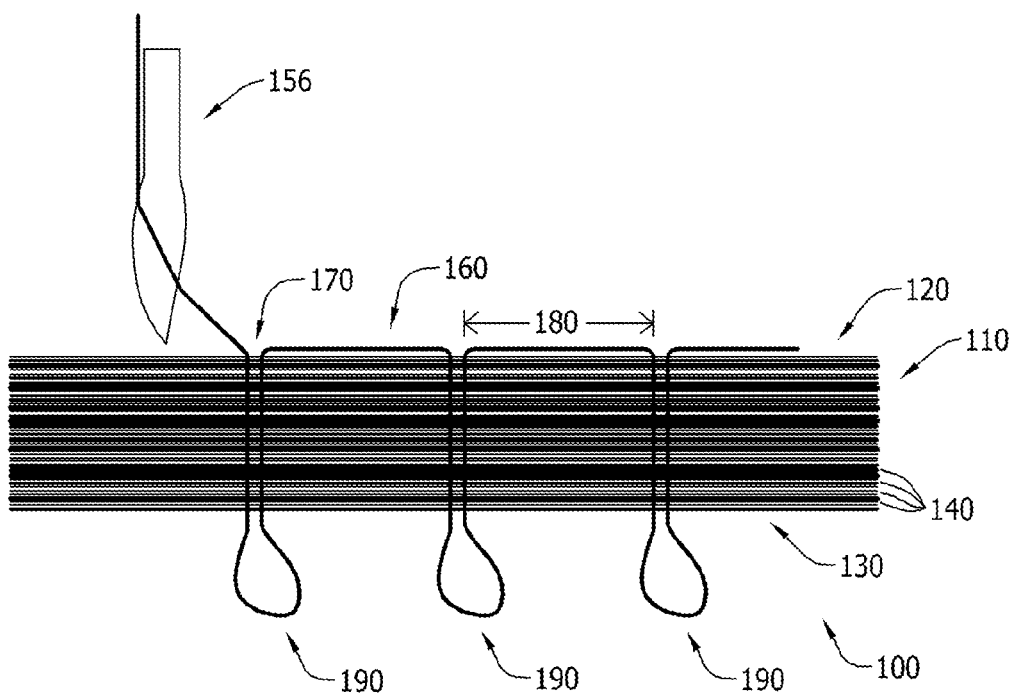
FIG. 1 is a cross-sectional view of an exemplary composite material.

FIG. 1 is a cross-sectional view of an exemplary composite material 100 including a composite body 110. In the exemplary embodiment, body 110 has a composite top surface 120, a composite bottom surface 130, and a matrix of fibers arranged in plurality of layers 140 between top surface 120 and bottom surface 130. In the exemplary embodiment, a glue and/or resin (not shown) may be used to couple and/or fuse layers 140 together. For example, in the exemplary embodiment, composite material 100 is a carbon-fiber material that is pre-impregnated with uncured epoxy resin. Alternatively, composite material 100 may be fabricated from any materials that enable the methods and systems to function as described herein.

In the exemplary embodiment, a tufting or sewing machine (not shown) includes a needle 150 and a thread or, more broadly, a reinforcing element 160 coupled to needle 150. In one embodiment, reinforcing element 160 is a stretch-broken carbon fiber and/or a carbon nanotube filament. Alternatively, reinforcing element 160 may be any material that enables needle 150 and/or composite material 100 to function as described herein. In the exemplary embodiment, needle 150 and/or reinforcing element 160 is traversed through body 110 to stitch composite material 100. More particularly, needle 150 is ultrasonically oscillated as needle 150 is traversed through body 110 to facilitate reducing damage to body 110, needle 150, and/or reinforcing element 160. In one embodiment, reinforcing element 160 extends through high strength, high toughness foams including, without limitation, an elastomeric polyurethane foam. Alternatively, needle 150 may be traversed through body 110 in any way that enables the methods and systems to function as described herein.

In the exemplary embodiment, reinforcing element 160 extends through body 110 to facilitate increasing a strength and/or durability of composite material 100. More particularly, reinforcing element 160 provides a surface that the glue and/or resin of composite material 100 can adhere and/or couple to. In the exemplary embodiment, reinforcing element 160 extends through body 110 in a plurality of stitches 170 including a downward pass and an upward pass. Alternatively, each stitch 170 may include any number of passes in any sequence that enables reinforcing element 160 to function as described herein. In the exemplary embodiment, adjacent stitches 170 are spaced a predetermined distance 180 apart and aligned substantially perpendicular to top surface 120 and/or bottom surface 130. Alternatively, stitches 170 may be spaced apart at any distance and/or aligned in any direction that enables the methods and systems to function as described herein.

In the exemplary embodiment, a plurality of loops 190 are formed along bottom surface 130 by leaving a length of reinforcing element 160 (i.e., slack) beyond or outside body 110 between the downward and upward passes. Additionally or alternatively, loops 190 may be formed along top surface 120 by leaving slack outside body 110 between the upward and downward passes. In at least some embodiments, reinforcing element 160 may be cut after each pass and/or stitch such that there is no loop 190 between sequential passes and/or adjacent stitches.

Figure 2:
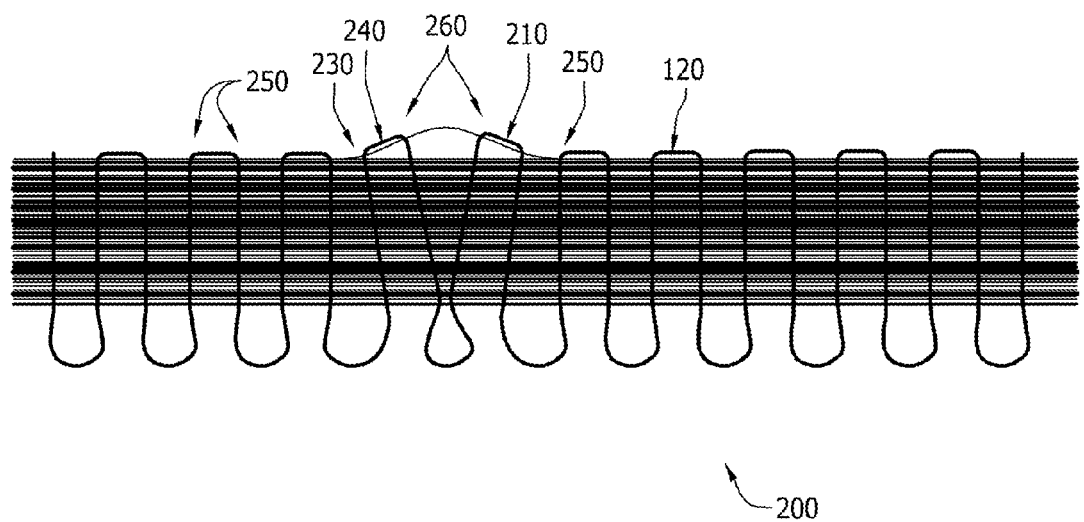
FIG. 2 is a schematic illustration of a stitching system that may be used to stitch the composite material shown in FIG. 1.

FIG. 2 is a schematic illustration of a stitching system 200 including a guide 210 coupled to composite material 100. More specifically, a bottom surface 220 of guide 210 is coupled to composite top surface 120 to form an augmented surface 230 including a top surface 240 of guide 210 and an exposed or uncovered portion of composite top surface 120.

In the exemplary embodiment, guide 210 is substantially convex in shape. More specifically, guide top surface 240 has a substantially curved or arcuate configuration, and guide bottom surface 220 has a substantially flat configuration. In the exemplary embodiment, guide 210 is oriented such that guide bottom surface 220 is substantially parallel to composite top surface 120 and/or guide top surface 240 is generally oblique to composite top surface 120. Alternatively, guide 210 may be configured and/or oriented in any way that enables the methods and systems to function as described herein.

In the exemplary embodiment, the glue and/or resin of composite material 100 is adhered and/or coupled to reinforcing element 160 to facilitate increasing a strength and/or durability of composite material 100. In the exemplary embodiment, reinforcing element 160 extends substantially perpendicular and/or normal to a tangent (not shown) of augmented surface 230. More particularly, in the exemplary embodiment, a first plurality of stitches 250 extend through composite body 110 substantially perpendicular to composite top surface 120. Because composite top surface 120 has a substantially flat configuration in the exemplary embodiment, first stitches 250 are aligned, relative to composite top surface 120, substantially similarly to each other.

Moreover, in the exemplary embodiment, a second plurality of stitches 260 extend through both composite body 110 and guide 210 substantially normal to a tangent of guide top surface 240. Because guide top surface 240 has a substantially curved or arcuate configuration in the exemplary embodiment, second stitches 260 are generally oblique to composite top surface 120. More particularly, second stitches 260 are aligned, relative to composite top surface 120, substantially dissimilarly to each other. Alternatively, reinforcing element 160 may be aligned and/or oriented in any direction that enables the methods and systems to function as described herein. In the exemplary embodiment, second stitches 260 are clustered or grouped adjacent to guide 210 between a pair of first stitches 250 positioned on opposite sides of guide 210. Alternatively, reinforcing element 160 may be in any position that enables the methods and systems to function as described herein.

During fabrication, guide 210 is coupled to composite material 100. In the exemplary embodiment, first stitches 250 are extended through composite body 110 substantially perpendicular to composite top surface 120, and second stitches 260 are extended through both composite body 110 and guide 210 substantially normal to a tangent of guide top surface 240. In the exemplary embodiment, second stitches 260 are clustered or grouped adjacent to guide 210 between a pair of first stitches 250 positioned on opposite sides of guide 210.

In the exemplary embodiment, composite material 100 or, more specifically, the epoxy resin is cured after first stitches 250 and/or second stitches 260 are extended through composite body 110. In the exemplary embodiment, the epoxy resin is adhered and/or coupled to at least a segment of reinforcing element 160 to facilitate increasing a strength and/or durability of composite material 100.

In the exemplary embodiment, guide 210 is decoupled from composite top surface 120 after the epoxy resin is cured. In the exemplary embodiment, reinforcing element 160 is cut adjacent to guide 210 and/or top surface 120 to facilitate decoupling guide 210 from composite material 100. Additionally, reinforcing element 160 may be cut adjacent to top surface 120 and/or bottom surface 130, resulting in the removal of at least some loops 190.

The embodiments described herein relate generally to stitching systems and, more particularly, to methods and systems for ultrasonically stitching composite materials. The embodiments described herein enable a strength of the composite material to be strengthened without substantially damaging the composite material. Accordingly, the embodiments described herein are configured to withstand high shear strains induced during extreme loading while maintaining a relatively light weight relative to at least some known conventional systems.

Exemplary embodiments of stitching systems are described above in detail. The methods ands systems are not limited to the specific embodiments described herein, but rather, components of systems and/or steps of the methods may be utilized independently and separately from other components and/or steps described herein. For example, the methods may also be used in combination with other stitching, sewing, or tufting systems and methods, and are not limited to practice with only the composite materials and methods as described herein. Rather, the exemplary embodiment can be implemented and utilized in connection with stitching, sewing, or tufting applications of other fabrics.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of stitching a composite material including a composite body having a composite surface, said method comprising:
   coupling a guide to the composite surface to form an augmented surface, wherein the augmented surface includes a guide surface and a portion of the composite surface;
   extending a reinforcing element through both the guide and the composite body, wherein the reinforcing element is aligned substantially perpendicular to the augmented surface, wherein extending the reinforcing element further comprises ultrasonically oscillating a needle coupled to the reinforcing element to facilitate extending the reinforcing element through at least one of the guide and the composite body; and
   decoupling the guide from the composite surface after the reinforcing element is extended through the composite body.

2. The method in accordance with claim 1, wherein coupling the guide further comprises orienting the guide such that the guide surface is generally oblique to the composite surface.

3. The method in accordance with claim 1, wherein extending the reinforcing element further comprises aligning the reinforcing element to be generally oblique to the composite surface.

4. The method in accordance with claim 1, wherein extending the reinforcing element further comprises extending the reinforcing element through the composite body in a plurality of stitches that are aligned relative to the augmented surface substantially similarly to each other.

5. The method in accordance with claim 1, wherein extending the reinforcing element further comprises extending the reinforcing element through the composite body in a first plurality of stitches and a second plurality of stitches, wherein the first plurality of stitches are aligned relative to the composite surface substantially similarly to each other, and the second plurality of stitches are aligned relative to the composite surface substantially dissimilarly to each other.

6. The method in accordance with claim 1 further comprising curing the composite material after the reinforcing element is extended through the composite body.

7. A system comprising:
   a composite body having a composite surface;
   a guide coupled to the composite surface to form an augmented surface, wherein the augmented surface includes a guide surface and a portion of the composite surface;
   a reinforcing element extending through both the guide and the composite body, wherein the reinforcing element is aligned substantially perpendicular to the augmented surface; and
   a needle coupled to the reinforcing element, wherein the needle oscillates ultrasonically and extends the reinforcing element through at least one of the guide and the composite body, wherein the guide is decoupled from the composite surface after the reinforcing element is extended through the composite body.

8. The system in accordance with claim 7, wherein the guide surface is generally oblique to the composite surface.

9. The system in accordance with claim 7, wherein the reinforcing element is aligned generally oblique to the composite surface.

10. The system in accordance with claim 7, wherein the reinforcing element extends through the composite body in a plurality of stitches that are aligned relative to the augmented surface substantially similarly to each other.

11. The system in accordance with claim 7, wherein the reinforcing element extends through the composite body in a first plurality of stitches and a second plurality of stitches, wherein the first plurality of stitches are aligned relative to the composite surface substantially similarly to each other, and the second plurality of stitches are aligned relative to the composite surface substantially dissimilarly to each other.

12. The system in accordance with claim 11, wherein at least one of the second plurality of stitches is positioned between at least one pair of the first plurality of stitches.

13. The system in accordance with claim 7, wherein the composite body comprises an epoxy resin.

\* \* \* \* \*